United States Patent Office 3,071,630
Patented Jan. 1, 1963

3,071,630
PRODUCTION OF DIARYL ALKENES
George L. Hervert, Downers Grove, and Carl B. Linn, Riverside, Ill., assignors to Universal Oil Products Company, Des Plaines, Ill., a corporation of Delaware
No Drawing. Filed Sept. 12, 1960, Ser. No. 55,152
1 Claim. (Cl. 260—668)

The present invention relates to a method for effecting the conversion of polyaryl alkanes into polyaryl alkenes, which method comprises dehydrogenating a polyaryl alkane at an elevated temperature within a particular range, resulting in substantial yields of a polyaryl alkene. More specifically, the present invention is directed toward a method for converting 1,1-diphenylethane into 1,1-diphenylethylene, and furthermore, will simultaneously achieve a rearrangement of aryl groups; for example, stilbene (1,2-diphenylethylene) is formed as a product, in addition to 1,1-diphenylethylene, when converting 1,1-diphenylethane.

Recently developed processes within the petroleum and chemical industries are currently being utilized for the purpose of producing various petro-chemical products. Generally, these petrochemical processes are directly concerned with one or more complex chemical reactions, as a result of which, compounds other than those particularly desired are produced. At the present time, a great many of these undesirable compounds find no particular valuable use within the petrochemical industry, and are, therefore, considered to be an economic loss insofar as concerns the desired product. For example, the process of alkylating aromatic compounds, such as benzene, utilizing refinery off-gas (described in detail in U.S. Patent No. 2,939,890), results in the formation of 1,1-diphenylethane, etc. The formation of this undesirable by-product is due to the presence of acetylene within the refinery off-gas. Depending upon the aromatic compound to be alkylated, and the chemical character of the off-gas, various homologs of 1,1-diphenylethane may result. The object of the present invention is to provide a method for converting these polyaryl alkanes into polyaryl alkenes, which compounds enjoy widespread utility both in and of themselves, and in the subsequent synthesis of a wide variety of other organic compounds. A related object of the present invention is to provide a method for the conversion of a particularly polyaryl alkane, namely, 1,1-diphenylethane, into a more valuable product, namely, 1,1-diphenylethylene, and further to produce high yields of the latter compound accompanied by a minimum of side reactions of the polyaryl alkane, resulting in substantial economic yield loss.

In a broad embodiment, the present invention involves a method for producing a polyaryl alkene which comprises dehydrogenating a polyaryl alkane at a temperature within the range of from about 450° C. to about 750° C. and in contact with a dehydrogenation catalyst disposed within a confined reaction zone, recovering said polyaryl alkene from the resultant reaction zone effluent.

In another broad embodiment, the present invention relates to a method for producing a diaryl alkene which comprises reacting a diaryl alkane at a temperature within the range of from about 450° C. to about 750° C. and in contact wtih a dehydrogenation catalyst disposed within a confined reaction zone, recovering said diaryl alkene from the resulting reaction zone effluent.

A more limited embodiment of the present invention is directed toward a method for producing a diphenylalkene which comprises reacting a diphenylalkane at a temperature of from about 550° C. to about 650° C., in contact with a catalyst comprising alumina and chromium, disposed within a reaction zone maintained at a pressure of from about 0.1 atmosphere to about 1.0 atmosphere, and recovering said diphenylalkene from the resulting reaction zone effluent.

A specific embodiment of the present invention involves a method for the production of stilbene which comprises reacting 1,1-diphenylethane, at a temperature of from about 600° C. to about 650° C., in contact with a catalyst comprising alumina and chromium disposed within a reaction zone maintained at a pressure of from about 0.01 atmosphere to about 1.0 atmosphere, recovering stilbene from the resulting reaction zone effluent.

Briefly, the present invention relates to a method for the conversion of a diaryl alkane, in which both aryl groups attach to the same carbon atom of the alkane, or may be attached to different carbon atoms thereof, into a diaryl alkene. The conversion is effected in the presence of a dehydrogenation catalyst at an elevated temperature within a particular range, and at comparatively low pressure. Accordingly, the production of the diaryl alkane, currently considered an item of economic yield loss, finds utility within the petrochemical industry as a starting material in the preparation of diaryl alkenes. The latter compounds are valuable in the subsequent preparation of dyes, as a reactant for the production of higher molecular weight polymers, and as a starting material for the production of various resins, etc. In one embodiment of the present invention, the diaryl alkene produced is stilbene, and this compound finds widespread utility in the synthesis of stilbene dyes containing the following chromophore groups:

(1)

(2)

Stilbene is also widely employed in the synthesis of diethylstilbestrol, which compound is employed in chemical research, medicine, and in poultry and stock feeding.

A particular embodiment of the present invention may be illustrated by the following chemical equations which indicate the conversion of 1,1-diphenylethane into 1,1-diphenylethylene and stilbene:

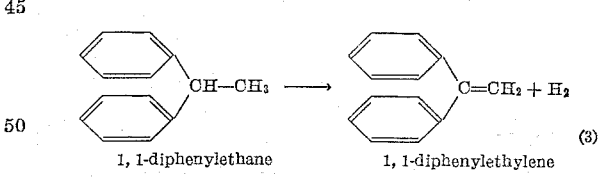

(3)

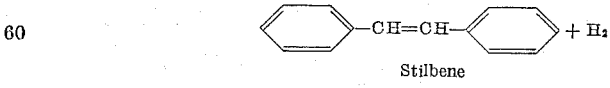

(4)

As hereinafter indicated in greater detail, the method of the present invention possesses an inherent degree of flexibility in that the production of stilbene may be effectively controlled by the temperature of the reaction zone in which the 1,1-diphenylethane contacts the dehydrogenation catalyst. Of greater significance, is the fact that a particular temperature, that is, within a particular temperature range, there exists substantially complete conversion of the diaromatic alkane into the diaromatic alkene. When the method of the present invention is conducted at conditions other than stated in the various embodiments of the present invention, significantly lower conversions of the diaromatic alkane are obtained. The necessity of the particular temperature range, as well as the inherent flexibility enjoyed by the present invention, is hereinafter illustrated in the various examples employed to indicate the unique results so obtained.

The particularly preferred polyaryl alkane, which is dehydrogenated according to the method of the present invention, is a diphenylalkane, and particularly 1,1-diphenylethane. Other diphenylalkanes, to which the present invention is applicable, include 1,1-diphenylpropane, 2,2-diphenylpropane, 1,1-diphenylbutane, 2,2-diphenylbutane, etc. All of the previously described diphenylalkanes are dehydrogenated into the corresponding diphenylalkenes, enjoying a substantial degree of conversion when such dehydrogenation is effected at elevated temperatures and low pressures according to the method of the present invention.

The dehydrogenation of the polyarylalkane, such as a diaryl alkane, may be effected in the presence of any suitable dehydrogenation catalyst having sufficient activity to carry out such a reaction. For example, when 1,1-diphenylethane is dehydrogenated, in contact with a catalyst comprising alumina and chromium, at particular temperatures, and at a pressure within the range of from about 0.01 atmosphere to about 1.0 atmosphere, the 1,1-diphenylethane is readily dehydrogenated into 1,1-diphenylethylene.

The dehydrogenation of 1,1-diphenylethane, for example, may be effected at pressures within the range of from about 0.01 atmosphere to about 1.0 atmosphere, and at elevated temperatures within the range of from about 450° C. to about 750° C. The particularly preferred temperature range, is from about 550° C. to about 650° C., for at temperatures both below and above, the extent of conversion to 1,1-diphenylethylene is substantially decreased. However, at temperatures of from about 600° C. to about 750° C., and especially up to 650° C., the decrease in conversion to the 1,1-diphenylethylene, is partially compensated for by the conversion of the 1,1-diphenylethane into stilbene. It is readily ascertained, therefore, that the present invention possesses an inherent degree of flexibility in that significant quantities of stilbene may be produced when various economic considerations so dictate. On the other hand, the 1,1-diphenylethane may be substantially completely converted into 1,1-diphenylethylene.

Any suitable dehydrogenation catalyst may be employed, as, for example, a catalyst comprising compounds of a metal of group VI-B of the periodic table. Suitable catalysts, which may be used in the dehydrogenation of a polyaryl alkane, include ammonium molybdate, ammonium thiomolybdate, molybdenum oxide, molybdenum disulfide, molybdenum trisulfide, molybdenum tetrasulfide, molybdenum dibromide, molybdenum tribromide, molybdenum tetrabromide, molybdenum dichloride, molybdenum trichloride, molybdenum tetrachloride, molybdenum dinitrate, molybdenum trinitrate, ammonium tungstate, ammonium thiotungstate, tungsten dioxide, tungsten trioxide, tungsten disulfide, tungsten trisulfide, tungsten dibromide, tungsten tetrabromide, tungsten pentabromide, tungsten dichloride, tungsten tetrachloride, tungsten tetrapentachloride, tungsten dinitrate, tungsten tetranitrate, ammonium chromate, ammonium thiochromate, chromium dioxide, chromic oxide, chromous oxide, chromic disulfide, chromous sulfide, chromic sulfate, chromous sulfate, chromic bromide, chromous bromide, chromic chloride, chromous chloride, chromic nitrate, chromous nitrate, etc. Generally, the aforementioned catalytically active metallic components will be employed in an amount of from about 5.0% to about 50.0% by weight of the total catalytic composite. Intermediate concentrations are preferred, and lie within the range of from about 10.0% to about 25.0% by weight.

Whatever dehydrogenation catalyst is selected, for utilization in the process of the present invention, it is generally composited with a highly refractory inorganic oxide such as alumina, zirconia, boria, silica, thoria, titania, hafnia, magnesia, mixtures of two or more, etc. It is understood that the refractory inorganic oxides hereinabove set forth, are intended to be illustrative rather than limiting upon the method of the present invention. It is further understood that these refractory inorganic oxides, as well as the catalytic composite, may be manufactured by any suitable method including separate, successive, or co-precipitation methods of manufacture. They may be naturally-occurring substances such as clays, sands or earths, which may be purified or activated with particular treatment. The process of the present invention may be effected in any suitable manner, although a continuous-type operation, effected within a confined reaction zone, is preferred. However, a batch type operation may be employed, wherein a quantity of the diaryl alkane and the dehydrogenation catalyst, is placed in an appropriate apparatus such as a rotating autoclave. The autoclave is sealed and adjusted to the desired operating pressure while the apparatus is heated to the desired temperature. After a predetermined period of time has elapsed, the apparatus and contents thereof are cooled to room temperature, and the desired reaction product, comprising a diaryl alkene, is separated from any unreacted diaryl alkane, by conventional means such as fractional distillation, etc. In the continuous-type operation, the dehydrogenation catalyst, such as alumina-magnesia-chromium, is disposed as a fixed-bed in a confined reaction zone, and is maintained at the appropriate operating conditions of elevated temperature and relatively low pressure. The confined reaction zone may comprise an unpacked vessel or coil, or may be lined with an adsorbent packing material such as fire brick, dehydrated bauxite, alumina, or the like. The diaryl alkane is continuously charged to the reaction zone, and contacts the dehydrogenation catalyst at a liquid hourly space velocity of from about 0.5 to about 10.0 (liquid hourly space velocity being defined as the volumes of liquid charge per hour per volume of catalyst disposed within the zone). The diaryl alkane may contact the catalyst in either upward flow, or downward flow, or in particular instances, in radial flow. The reaction zone effluent is continuously withdrawn from the reaction zone, and separated by any suitable means to yield the desired product, and to permit internal recycling of the unrecated diaryl alkane. Furthermore, the 1,1-diphenylethylene, produced when the charge is 1,1-diphenylethane, may be recycled to increase the ultimate yield of the highly desirable stilbene, should economic considerations so dictate. An added advantage of the method of the present invention, is that substantial quantities of relatively pure hydrogen are produced. The hydrogen may be recovered by passing the total reaction zone effluent into a high-pressure separator, maintained at relatively low temperaturse, whereby the hydrogen is removed as a gaseous phase.

The following examples are given to further illustrate the method of the present invention, and to indicate the benefits to be afforded through the utilization thereof. The examples are not intended to limit the generally broad scope of the present invention beyond the spirit of the appended claims.

EXAMPLE I

An alumina-magnesia-chromium catalyst, in an amount of 41.4 grams, was placed within a cylindrical stainless steel reaction zone, having an inside diameter of about ⅞ inch. The catalyst consisted of 2.0% by weight MgO, 12.0% by weight of $Cr_2O_3$ and 86.0% by weight of $Al_2O_3$. The cylindrical reaction zone had a screen member in the lower portion thereof to prevent the loss of said catalyst particles as the product effluent was removed from the reaction zone. An inlet conduit was provided in the upper portion of the reaction zone, and an outlet conduit, below the aforementioned screen member, was provided such that the diaromatic alkane and resulting conversion product, passed downwardly through the reactor, discharging therefrom substantially free from catalyst particles.

The reaction zone was heated to a temperature of about 600° C., at atmospheric pressure, after which, 1,1-diphenylethane was introduced into the inlet of the reactor at a rate of 11.6 grams per hour. During this test run, which was conducted for a total period of four hours, the liquid hourly space velocity was 3.2. The effluent withdrawn from the outlet of the reaction zone was subjected to an analysis to determine the degree of conversion of the 1,1-diphenylethane. The following results were obtained upon analysis of the effluent stream, following the separation of hydrogen therefrom, as hereinbefore described: 4.0% by weight of 1,1-diphenylethane, 87% by weight of 1,1-diphenylethylene, 7% by weight of stilbene, and a trace of diphenyl. These results indicate that of the 46.5 grams of 1,1-diphenylethane charged to the reactor, during the four-hour test period, 96.0% by weight of said 1,1-diphenylethane was converted, and that 87.0% by weight was dehydrogenated to yield 1,1-diphenylethylene.

EXAMPLE II

The procedure hereinbefore described with respect to Example I was repeated, changing only the operating temperature at which the reaction zone was maintained. At a temperature of 550° C., the analysis of the effluent stream indicated that only 63.0% by weight of the 1,1-diphenylethane was converted, and that said effluent stream had the following composition: 29.0% by weight of 1,1-diphenylethane, 69.0% by weight of 1,1-diphenylethylene, 2.0% by weight of stilbene, and a negligible quantity of diphenyl.

At a temperautre of 450° C., only 10.0% by weight of the 1,1-diphenylethane was converted, the composition of the product effluent, following the removal of hydrogen therefrom, was as follows: 89.0% by weight of 1,1-diphenylethane, 11.0% by weight of 1,1-diphenylethylene, a negligible quantity of diphenyl, and virtually no stilbene.

At a temperature of 625° C., an analysis of the effluent stream indicated that 86.0% by weight of the 1,1-diphenylethane was converted, and that the effluent stream had the following composition: 14.0% by weight of 1,1-diphenylethane, 82.0% by weight of 1,1-diphenylethylene and 4.0% by weight of stilbene, there being no positive indication of the presence of diphenyl.

For convenience, the results of the foregoing examples are indicated in the following table presenting the operating temperature, the product composition in weight percent, and the weight percent conversion of 1,1-diphenylethane.

*Table.—Composition of Product Effluent*

| Operating Temperature, ° C. | 450 | 500 | 550 | 625 [1] | 600 |
|---|---|---|---|---|---|
| Product Composition, wt. percent: | | | | | |
| 1,1-diphenylethane | 89 | 62 | 29 | 14 | 4 |
| 1,1-diphenylethylene | 11 | 37 | 69 | 78 | 87 |
| Stilbene | 0 | 1 | 2 | 8 | 7 |
| Percent conversion of 1,1-diphenylethane | 10 | 37 | 63 | 86 | 96 |

[1] An operation at 630° C. indicated 10.0% by weight of stilbene in the product effluent.

The advisability of operating, preferably within a rather narrow temperature range, is readily ascertained from the foregoing tabulated data. Although there is a significant conversion of the 1,1-diphenylethane at temperatures below about 550° C., the greater conversion occurs at a temperature within the range of about 550° C. to about 600° C. At temperatures in excess of about 600° C., such as 625° C. which is illustrated, the percent conversion of 1,1-diphenylethane has already begun to decline. In regard to the operation effected at 625° C., the division of composition between 1,1-diphenylethylene and stilbene, is approximated due to an error in analysis following the separation therefrom of the 14 weight percent 1,1-diphenylethane. It is, however, definitely known that the percent conversion of the 1,1-diphenylethane, amounted to 86.0% by weight. As indicated, an operation effected at 630° C. resulted in the formation of 10.0% by weight of stilbene in the product effluent. Thus, where economic consideration so require, up to about 10.0% by weight of stilbene may be produced, although sacrificing a slight degree of conversion, thereby necessitating a recycle of the unreacted 1,1-diphenylethane. Such flexibility is primarily due to the virtual total lack of conversion of the charge stock into the undesirable product, diphenyl.

The foregoing specification and examples clearly illustrate the method of the present invention by which a polyarylalkane is substantially, completely converted into a polyaryl alkene, and indicate the particular benefits to be afforded through the utilization of a rather limited range of temperature at which the operation is effected.

We claim as our invention:

A method for the production of stilbene which comprises reacting 1,1-diphenylethane, at a temperature of from about 600° C. to about 650° C., in contact with a catalyst comprising alumina and chromium disposed within a reaction zone maintained at a pressure of from about 0.01 atmosphere to about 1.0 atmosphere, recovering stilbene from the resulting reaction zone effluent.

References Cited in the file of this patent

UNITED STATES PATENTS

| 2,422,163 | Dixon | June 10, 1947 |
| 2,422,169 | May et al. | June 10, 1947 |
| 2,450,334 | Dixon et al. | Sept. 28, 1948 |
| 2,586,377 | Pitzer | Feb. 19, 1952 |